United States Patent
Kim

(10) Patent No.: US 11,202,028 B2
(45) Date of Patent: Dec. 14, 2021

(54) DISPLAY DEVICE CONFIGURING MULTI DISPLAY SYSTEM AND CONTROL METHOD THEREOF

(71) Applicant: SAMSUNG ELECTRONICS CO., LTD., Suwon-si (KR)

(72) Inventor: Hyun-jong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/933,786

(22) Filed: Mar. 23, 2018

(65) Prior Publication Data

US 2018/0295315 A1    Oct. 11, 2018

(30) Foreign Application Priority Data

Apr. 5, 2017  (KR) .................. 10-2017-0044088
Dec. 14, 2017 (KR) .................. 10-2017-0172423

(51) Int. Cl.
*H04N 5/45* (2011.01)
*H04N 21/426* (2011.01)
(Continued)

(52) U.S. Cl.
CPC ............. *H04N 5/45* (2013.01); *G06F 3/1446* (2013.01); *G09G 5/14* (2013.01);
(Continued)

(58) Field of Classification Search
CPC .................................................... H04N 5/45
See application file for complete search history.

(56) References Cited

U.S. PATENT DOCUMENTS 6,583,771 B1   6/2003  Furuhashi et al.
9,300,906 B2   3/2016  Kokaram et al.
(Continued)

FOREIGN PATENT DOCUMENTS

CN   105120305 A    12/2015
EP   1 439 455 A1   5/2003
(Continued)

OTHER PUBLICATIONS

Notice of Preliminary Rejection dated Jul. 2, 2018 in counterpart Korean Patent Application No. 10-2017-0172423 and English-language translation thereof.
(Continued)

*Primary Examiner* — John W Miller
*Assistant Examiner* — Justin B Sanders
(74) *Attorney, Agent, or Firm* — Nixon & Vanderhye P.C.

(57) ABSTRACT

A display device configured as a multi display system is provided. The display device includes an input; a display; an output connected to an adjacent display device; and a processor, wherein the processor is configured to control the output to insert image output information into at least one of frames of a first predetermined interval in a first image and frames of a second predetermined interval in a second image when the first image and the second image are received through the input, and to alternately transmit the frames of the first interval and the frames of the second interval to an adjacent display device, and to control the display to display some regions of one of the frames of the first interval and the frames of the second interval based on display layout information.

19 Claims, 16 Drawing Sheets

(51) Int. Cl.
*H04N 21/434* (2011.01)
*H04N 21/462* (2011.01)
*H04N 21/41* (2011.01)
*H04N 21/431* (2011.01)
*G06F 3/14* (2006.01)
*G09G 5/14* (2006.01)
*H04N 21/81* (2011.01)

(52) U.S. Cl.
CPC ..... *H04N 21/4122* (2013.01); *H04N 21/4263* (2013.01); *H04N 21/4316* (2013.01); *H04N 21/4344* (2013.01); *H04N 21/4347* (2013.01); *H04N 21/4622* (2013.01); *G09G 2310/04* (2013.01); *G09G 2356/00* (2013.01); *H04N 21/812* (2013.01)

(56) References Cited

U.S. PATENT DOCUMENTS

| | | | |
|---|---|---|---|
| 2003/0098820 A1 | 5/2003 | Someya et al. | |
| 2003/0191850 A1 | 10/2003 | Thornton | |
| 2008/0002894 A1* | 1/2008 | Hayon | G06F 3/1462 382/232 |
| 2008/0022307 A1* | 1/2008 | Jeong | H04N 21/443 725/44 |
| 2008/0108392 A1 | 5/2008 | Moon et al. | |
| 2008/0211825 A1 | 9/2008 | Sunakawa et al. | |
| 2008/0285087 A1 | 11/2008 | Perkins et al. | |
| 2011/0122048 A1 | 3/2011 | Choi et al. | |
| 2011/0157334 A1 | 6/2011 | Kim et al. | |
| 2012/0188459 A1* | 7/2012 | Madonna | H04N 5/265 348/589 |
| 2012/0281150 A1* | 11/2012 | Glen | H04N 21/43632 348/739 |
| 2013/0191850 A1 | 7/2013 | Fischer et al. | |
| 2014/0160354 A1 | 6/2014 | Park et al. | |
| 2015/0138038 A1* | 5/2015 | Nam | G06F 3/1446 345/1.3 |
| 2016/0018905 A1 | 1/2016 | Nagao | |
| 2016/0021394 A1 | 1/2016 | Watson | |
| 2016/0093271 A1 | 3/2016 | Cho et al. | |
| 2016/0127770 A1 | 5/2016 | Je et al. | |
| 2016/0335039 A1 | 11/2016 | Cho et al. | |
| 2017/0069258 A1 | 3/2017 | Hussain | |
| 2017/0262994 A1* | 9/2017 | Kudriashov | G06K 9/00281 |

FOREIGN PATENT DOCUMENTS

| | | |
|---|---|---|
| JP | 2016-021699 | 2/2016 |
| KR | 10-2005-0062888 | 6/2005 |
| KR | 10-2008-0040526 | 5/2008 |
| KR | 10-2009-0030099 | 3/2009 |
| KR | 10-2011-0087438 | 8/2011 |
| KR | 10-1205452 | 3/2013 |
| KR | 10-2015-0026391 | 3/2015 |
| KR | 10-2015-0057421 | 5/2015 |
| KR | 10-1632572 | 6/2016 |
| KR | 10-2016-0133867 | 11/2016 |

OTHER PUBLICATIONS

Search Report dated Jul. 16, 2018 in counterpart International Patent Application No. PCT/KR2018/003736.
Written Opinion dated Jul. 16, 2018 in counterpart International Patent Application No. PCT/KR2018/003736.
Korean Office Action dated Jan. 29, 2019 for KR Application No. 10-2017-0172423.
EP Partial Search Report dated Nov. 11, 2019 for EP Application No. 18780499.2.
European Office Action dated Mar. 3, 2020 for EP Application No. 18780499.2.
Chinese Office Action dated Jul. 22, 2021 for CN Application No. 201880021155.X.

* cited by examiner

FIG. 3A
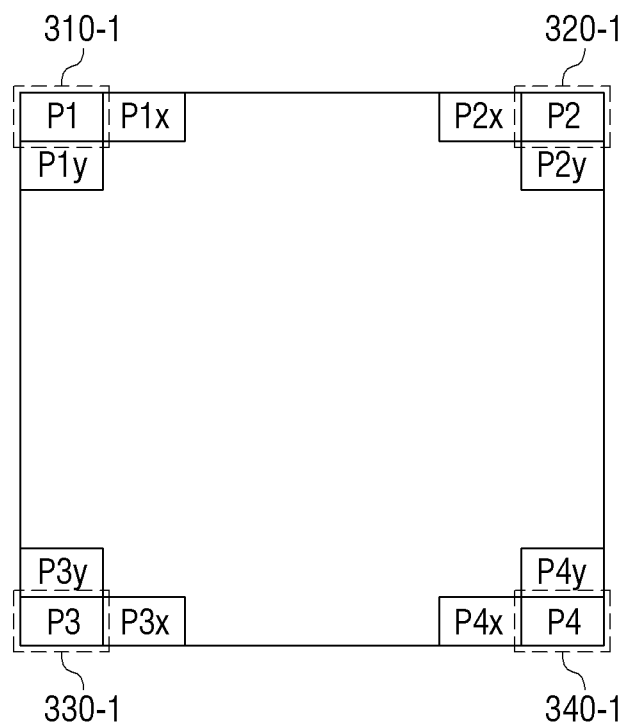
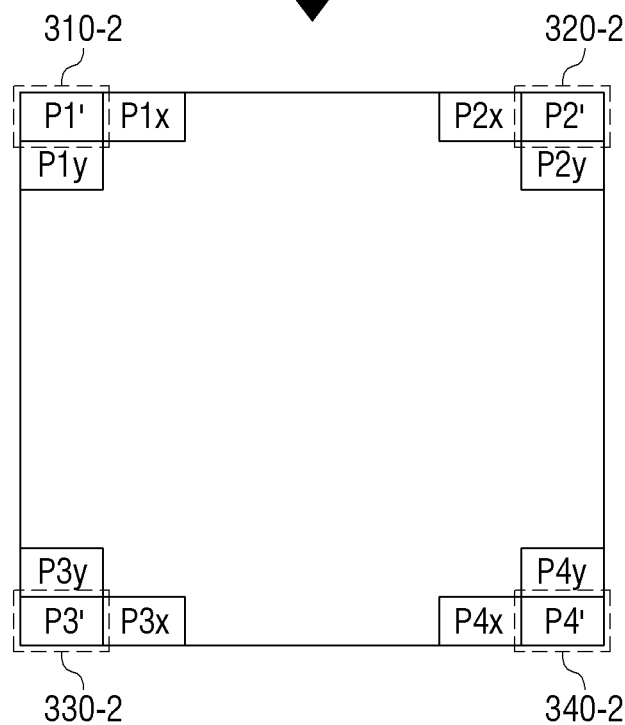

FIG. 3B

|     | R(8bit) | G(8bit) | B(8bit) |
|-----|---------|---------|---------|
| P1' | data1   | data2   | CRC1    |
| P2' | data3   | data4   | CRC2    |
| P3' | data5   | data6   | CRC3    |
| P4' | data7   | data8   | CRC4    |

FIG. 3C

|       | 7 | 6 | 5 | 4 | 3 | 2 | 1 | 0 |
|-------|---|---|---|---|---|---|---|---|
| data1 | Setting data Type = 0x01 |||| Data Length = 0x06 ||||
| data2 | Year(8bit) (1900 + 0~255) ||||||||
| data3 | Month(4bit) (1~12) |||| Reserve ||||
| data4 | Day(5bit) (1~31) ||||| Reserve |||
| data5 | Hour(5bit) (0~23) ||||| Reserve |||
| data6 | Minute(6bit) (0~59) |||||| Reserve ||
| data7 | Second(6bit) (0~59) |||||| Reserve ||
| data8 | Reserve ||||||||

FIG. 7C

|     | R(8bit) | G(8bit) | B(8bit) |
|-----|---------|---------|---------|
| P1' | data1   | data2   | CRC1    |
| P2' | data3   | data4   | CRC2    |
| P3' | data5   | data6   | CRC3    |
| P4' | data7   | data8   | CRC4    |

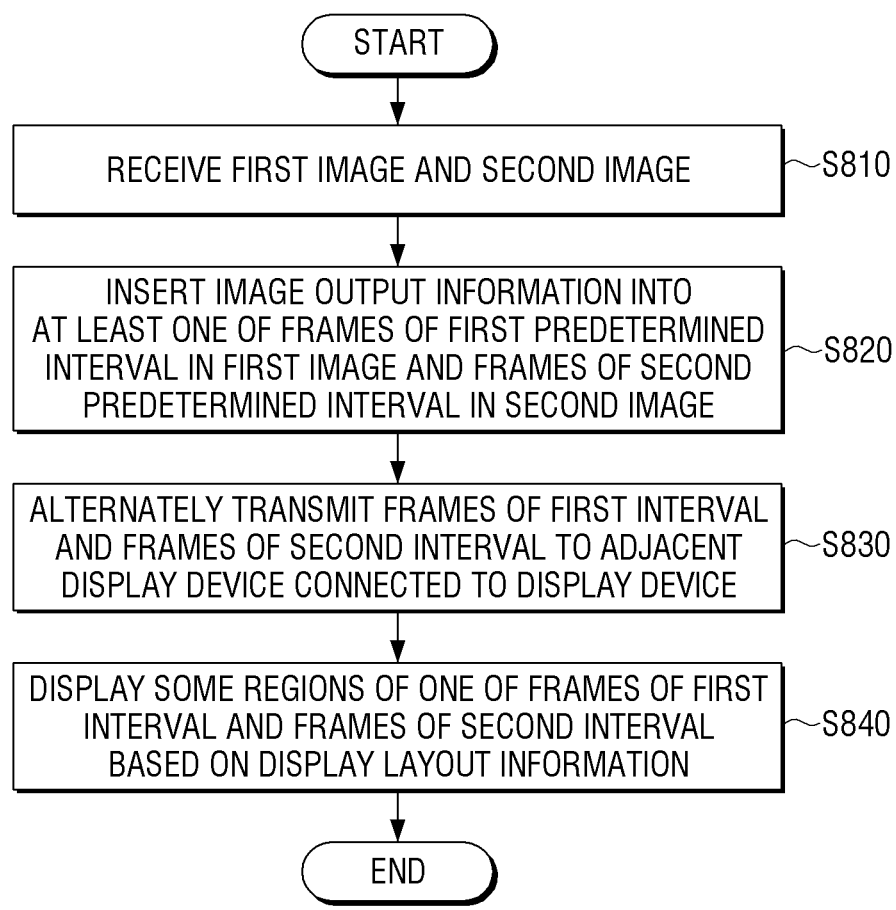

DISPLAY DEVICE CONFIGURING MULTI DISPLAY SYSTEM AND CONTROL METHOD THEREOF

CROSS-REFERENCE TO RELATED APPLICATIONS

This application is based on and claims priority under 35 U.S.C. § 119 to Korean Patent Application No. 10-2017-0044088, filed on Apr. 5, 2017 and Korean Patent Application No. 10-2017-0172423, filed on Dec. 14, 2017 in the Korean Intellectual Property Office, the disclosures of which are incorporated by reference herein in their entireties.

BACKGROUND

Field

The present disclosure relates generally to a display device and a control method thereof, and for example, to a plurality of display devices configuring a multi display system and a control method thereof.

Description of Related Art

In general, a display device is a device that displays one or more images on one screen. However, a plurality of display devices are used to display one image, and in this case, the plurality of display devices are sequentially connected to each other, and an image which is input from a source device is sequentially transmitted from a first display device to a final display device. In addition, each of the plurality of display devices displays only some regions of an image frame. A system in which such a function is implemented is referred to as a multi display system.

However, a conventional multi display system may display only one image, and does not provide a function in which it receives a plurality of images and displays the received images in a picture in picture (PIP) way.

Further, the plurality of display devices included in the multi display system may provide the same effect as reproducing the image using one display when being driven with the same display setting information.

However, the plurality of display devices included in the conventional multi display system do not share the display setting information with each other, and in other words, the user must typically separately input the display setting information to the plurality of display devices. Accordingly, a method for receiving a plurality of images from a multi display system and displaying the received images in a PIP way, and a method for unifying display setting information of a plurality of display devices need to be developed.

SUMMARY

Various example embodiments of the present disclosure address the above disadvantages and other disadvantages not described above.

The present disclosure provides a display device for implementing a multi display system that receives a plurality of image, provides a picture in picture (PIP) screen, and shares display setting information, and a control method thereof.

According to an example aspect of the present disclosure, a display device configured as a multi display system includes an input; a display; an output configured to be connected to an adjacent display device; and a processor, wherein the processor is configured to control the output to insert image output information into at least one of frames of a first predetermined interval in a first image and frames of a second predetermined interval in a second image when the first image and the second image are received through the input, and to alternately transmit the frames of the first interval and the frames of the second interval to the adjacent display device, and to control the display to display some regions of one of the frames of the first interval and the frames of the second interval based on display layout information.

The display device may further include a storage in which the display layout information is stored, the display layout information may include first information on a position of the display device among a plurality of display devices comprising the multi display system, and second information on a position of the display device of a plurality of display devices configuring a picture in picture (PIP) screen provided in a PIP mode, and the processor may be configured to determine a displayed region of the image provided in each of a normal mode and the PIP mode based on the first information and the second information stored in the storage.

The processor may use one of even-numbered frames and odd-numbered frames of the first image as the frame of the first interval and use one of even-numbered frames and odd-numbered frames of the second image as the frame of the second interval.

The image output information may include image identification information for identifying the first image and the second image, and the processor may insert the image identification information by changing a pixel value of a pixel disposed at a predetermined position of one of the frames of the first interval and the frames of the second interval.

The processor may insert the image identification information by changing a pixel value of at least one pixel disposed at a position of a vertex of one of the frames of the first interval and the frames of the second interval based on at least one peripheral pixel value, and changing pixel values of the remaining pixels based on the changed pixel value.

The image output information may further include display setting information applied to the multi display system, and the processor may insert the display setting information by changing a pixel value of a pixel disposed at a predetermined position of the other of the frames of the first interval and the frames of the second interval, and displays some regions of one of the frames of the first interval and the frames of the second interval based on the display setting information.

The processor may insert the display setting information by changing sub-pixels values of two sub-pixels of a R sub-pixel, a G sub-pixel, and a B sub-pixel of at least one pixel disposed at a position of a vertex of the other of the frames of the first interval and the frames of the second interval base on the display setting information, and changing a sub-pixel value of the remaining one of the R sub-pixel, the G sub-pixel, and the B sub-pixel based on the changed sub-pixel values of the two sub-pixels.

The image output information may include display setting information applied to the multi display system, and the processor may insert the display setting information by changing a pixel value of a pixel disposed at a predetermined position of one of the frames of the first interval and the frames of the second interval, and displays some regions of one the frames of the first interval and the frames of the second interval based on the display setting information.

The processor may transmit mode information instructing an operation in the PIP mode to the adjacent display device when the first image and the second image are received through the input.

The display device may further include a communicator comprising communication circuitry configured to perform communication with an external server, wherein the processor requests an additional image corresponding to the first image from the external server when the first image is received through the input, and sets the additional image as the second image when the additional image is received from the external server.

According to another example aspect of the present disclosure, a display device configured as a multi display system includes an input configured to be connected to an adjacent display device; a display; and a processor, wherein an image received through the input is an image in which frames of a first predetermined interval in a first image and frames of a second predetermined interval in a second image are alternately disposed, and image output information is inserted into at least one of the frames of the first interval and the frames of the second interval, and the processor is configured to distinguish the frames of the first interval and the frames of the second interval by detecting the image output information from the frames configuring the received image, and to control the display to display some regions of one of the frames of the first interval and the frames of the second interval based on display layout information.

The display device may further include a storage in which the display layout information is stored, the display layout information includes first information on a position of the display device among a plurality of display devices configuring the multi display system, and second information on a position of the display device of a plurality of display devices configuring a picture in picture (PIP) screen provided in a PIP mode, and the processor is configured to determine a displayed region of the image provided in each of a normal mode and the PIP mode based on the first information and the second information stored in the storage.

The image output information may include image identification information for identifying the first image and the second image, and the processor may detect the image identification information based on a pixel value of a pixel disposed at a predetermined position in the frames configuring the received image, and distinguish the frames of the first interval and the frames of the second interval based on the image identification information.

The image output information may further include display setting information applied to the multi display system, and the processor may detect the display setting information based on pixel values of a R sub-pixel, a G sub-pixel, and a B sub-pixel of at least one pixel disposed at a predetermined position in the frames configuring the received image, and display some regions of one of the frames of the first interval and the frames of the second interval based on the display setting information.

The image output information may include display setting information applied to the multi display system, and the processor may detect the display setting information based on pixel values of a R sub-pixel, a G sub-pixel, and a B sub-pixel of at least one pixel disposed at a predetermined position in the frames configuring the received image, distinguish the frames of the first interval and the frames of the second interval depending on whether or not the display setting information is detected, and display some regions of one of the frames of the first interval and the frames of the second interval based on the display setting information.

According to still another example aspect of the present disclosure, a method of controlling a display device configured as a multi display system includes receiving a first image and a second image; inserting image output information into at least one of frames of a first predetermined interval in the first image and frames of a second predetermined interval in the second image; alternately transmitting the frames of the first interval and the frames of the second interval to an adjacent display device connected to the display device; and displaying some regions of one of the frames of the first interval and the frames of the second interval based on display layout information.

The display layout information may include first information on a position of the display device among a plurality of display devices configuring the multi display system, and second information on a position of the display device of a plurality of display devices configuring a picture in picture (PIP) screen provided in a PIP mode, and in the displaying of some region one of the frames of the first interval and the frames of the second interval, a displayed region of the image provided in each of a normal mode and the PIP mode may be determined based on the first information and the second information.

In the inserting of the image output information into at least one of frames of a first predetermined interval in the first image and frames of a second predetermined interval in the second image, one of even-numbered frames and odd-numbered frames of the first image may be used as the frame of the first interval and one of even-numbered frames and odd-numbered frames of the second image may be used as the frame of the second interval.

The image output information may include image identification information for identifying the first image and the second image, and in the inserting of the image output information into at least one of frames of a first predetermined interval in the first image and frames of a second predetermined interval in the second image, the image identification information may be inserted by changing a pixel value of a pixel disposed at a predetermined position of one of the frames of the first interval and the frames of the second interval.

According to still another example aspect of the present disclosure, a method of controlling a display device configured as a multi display system includes receiving an image in which frames of a first predetermined interval in a first image and frames of a second predetermined interval in a second image are alternately disposed, and image output information is inserted into at least one of the frames of the first interval and the frames of the second interval, from an adjacent display device connected to the display device; distinguishing the frames of the first interval and the frames of the second interval by detecting image output information from the frames configuring the received image; and displaying some regions of one of the frames of the first interval and the frames of the second interval based on display layout information.

According to the various example embodiments of the present disclosure, the display device may implement the multi display system capable of sharing the display setting information and providing the PIP screen by inserting the image output image into the predetermined frame of each of the plurality of input images and alternately transmitting the frames to the adjacent display device.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIGS. 3A, 3B and 3C are diagrams illustrating a method for inserting image output information according to various example embodiments of the present disclosure;

FIGS. 7A, 7B and 7C are diagrams illustrating a method for detecting image output information from received image according to an example embodiment of the present disclosure;

FIG. 8 is a flowchart illustrating a method of controlling a display device according to an example embodiment of the present disclosure.

DETAILED DESCRIPTION

Figure 1:
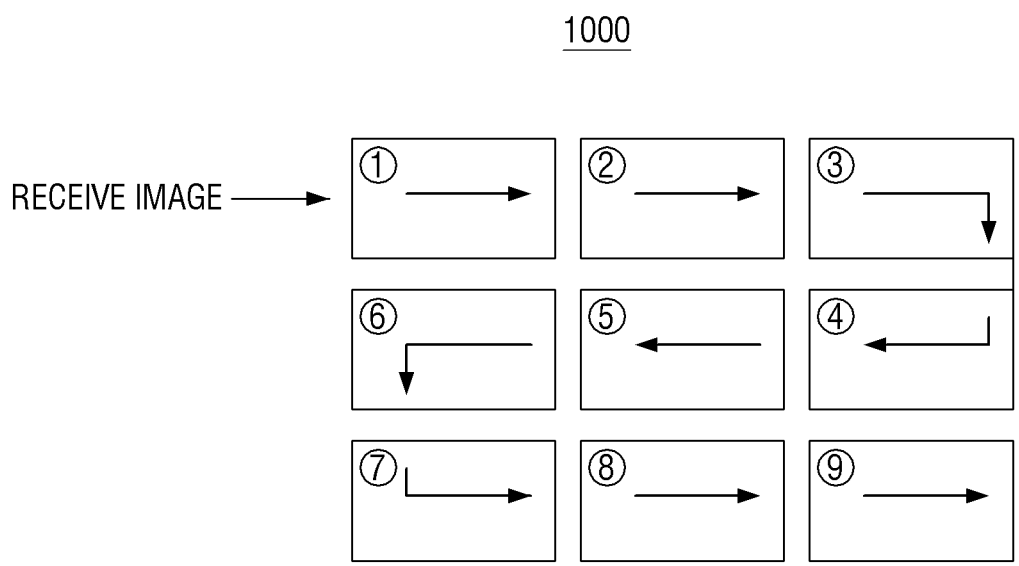
FIG. 1 is a diagram illustrating a multi display system according to an example embodiment of the present disclosure.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, alternatives and substitutions without departing from the scope and spirit of the present disclosure. Also, well-known functions or constructions may not be described in detail if they would obscure the disclosure with unnecessary detail.

Hereinafter, the present disclosure will be described in greater detail with reference to the accompanying drawings.

FIG. 1 is a diagram illustrating a multi display system 1000 according to an example embodiment of the present disclosure. As illustrated in FIG. 1, a multi display system 1000 includes a plurality of display devices.

The multi display system 1000 may include the plurality of display devices, and display an image using the plurality of display devices.

The multi display system 1000 may operate in a normal mode and a picture in picture (PIP) mode. In a case in which the multi display system 1000 operates in the normal mode, the multi display system 1000 may display one image using the plurality of display devices.

In this case, each of the plurality of display devices may divide one image into a plurality of regions, and each display a corresponding region. For example, a first display device in the multi display system 1000 of 3×3 may divide each frame of the image into 3×3 regions, and may sequentially display a region of a left upper end of each frame. Here, the first display device means a display device that receives the image from an external device, not the device in the multi display system 1000. The remaining display devices other than the first display device may receive the image from adjacent display devices.

The PIP mode may be a mode in which a sub image is overlaid on a main image to be displayed. In a case in which the multi display system 1000 operates in the PIP mode, at least one display device of the plurality of display devices may display the sub image, and the remaining display devices may display one region of the main image.

For example, when the mode is changed from the normal mode in which only the main image is displayed to the PIP mode, the remaining display devices operate in the same way as in the normal mode, but at least one display device may divide the sub image into the plurality of regions and display the divided sub image.

The first display device may receive the image from a source device. The first display device may process the received image and transmit the processed image to an adjacent second display device. For example, the first display device may transform the received image to correspond to a DP format and transmit the processed image to an adjacent second display device.

The first display device may receive a plurality of images from the source device. The first display device may process the plurality of received images and transmit the processed images to an adjacent second display device. A method for processing a plurality of images will be described below.

Other display devices other than the first display device may receive the image from an adjacent previous display device, and transmit the received image to an adjacent next display device. That is, the image is not simultaneously received by the plurality of display devices, but is sequentially received according to a layout order of the plurality of display devices. Such a multi display system 1000 is referred to as a loop out system.

The plurality of display devices may crop the received image into a plurality of images according to the number of display devices and display an image corresponding to each of the display devices. For example, in the case of the 3×3 multi display system 1000 of FIG. 1, the first display device may display only a divided image corresponding to a left upper end among 9 divided images obtained by dividing each frame of the image into 3×3.

The plurality of display devices may display one frame by almost simultaneously displaying the divided images corresponding to the respective display devices using a frame lock function.

The frame lock function may refer, for example, to a point of time at which the image is displayed is determined based on a point of time at which the image is received. For example, the first display device may display one region of the image after a predetermined time after receiving the image from the source device. In addition, the second display device may display one region of the image after a predetermined time after receiving the image from the first display device, and the predetermined time may be the same as in the first display device.

The predetermined time may be set to be greater than a time in which the display device processes the image. Therefore, the plurality of display devices may display the image after the same predetermined time elapses after the respective display devices receive the image.

When each of the plurality of display devices receives the image, the each of the plurality of display devices transmits the received image to an adjacent display device. Therefore, a different in time at which the image is displayed by the time in which the image is transmitted may occur between the adjacent display devices. However, since such a difference in time corresponds to a short time that is not noticeable by a person, it is not a factor interfering with a user's viewing.

Meanwhile, the same predetermined time is merely one example. For example, it is also possible to shorten the predetermined time in the order from the first display device to ninth display device. In the case in which the predetermined time is shortened by the time in which the image transmitted between the adjacent display devices, the time at which the image is displayed on all the display devices may be the same.

Meanwhile, the mode of the multi display system 1000 may be changed by a user command. For example, when user generates a control command for operating in the normal mode using a remote control device, the first display device may receive the control command and transmit mode information instructing the operation in the normal mode to the adjacent display device. In this case, the first display device may transmit only one image to the adjacent display device even in a case in which a plurality of images are received.

Hereinafter, an operation of the first display device in a case in which the multi display system 1000 operates in the PIP mode is will be first described.

Thereafter, an operation of the remaining display devices other than the first display device in a case in which the multi display system 1000 operates in the PIP mode is will be described.

<First Display Device in Multi Display System 1000>

Figure 2A:
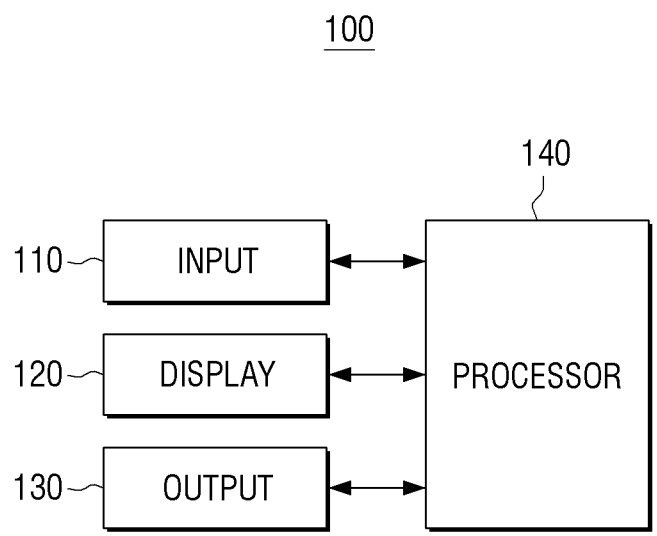
FIG. 2A is a block diagram illustrating a configuration of a display device according to an example embodiment of the present disclosure.

FIG. 2A is a block diagram illustrating an example configuration of the display device 100 according to an example embodiment of the present disclosure.

Referring to FIG. 2A, the display device 100 includes an input 110, a display 120, an output 130, and a processor (e.g., including processing circuitry) 140.

The input 110 may refer, for example, to a configuration for receiving the image from the source device. Here, the input 110 may include, for example, and without limitation, a plurality of input ports for receiving images of a digital visual interface (DVI), a display port (DP), a high definition multimedia interface (HDMI), a component, RS232C communication, a broadcasting signal receiver, or the like. The source device, which may refer, for example, to a device capable of transmitting the image to the display device 100, may, for example, and without limitation, be a personal computer (PC), a DVD player, a BD player, a PVR, an external server, and a web server, or the like. The input 110 may simultaneously receive a first image and a second image using the plurality of input ports.

The input may further include an input terminal for controlling the display device 100 other than the input ports described above. Further, the input 110 may include a detection connector capable of confirming a connection with peripheral display devices, and in addition, the input 110 may include various input ports as needed.

The display 120 may refer, for example, to a configuration for displaying the image processed by the processor 140. The display 120 may be implemented, for example, and without limitation, as a cathode ray tube (CRT), a liquid crystal display (LCD), a light emitting diode (LED), and a plasma display panel (PDP), or the like, but is not limited thereto. In addition, the display 120 may also be implemented as a flexible display, a transparent display, or the like, as needed.

The output 130 may refer, for example, to a configuration for transmitting the image processed by the processor 140 to the adjacent display device. Here, the output 130 may be implemented, for example, and without limitation, as a connector of a display port (hereinafter, referred to as DP) format including an auxiliary channel, or the like. However, the output 130 is not limited thereto, and may also be implemented as various types of connectors including the auxiliary channel.

The processor 140 may include various processing circuitry for controlling an overall operation of the display device 100.

The processor 140 may process the received image. For example, when the image is received, the processor 140 may process the received image to correspond to the DP format. In this case, the processor 140 may perform a decoding, a scaling, a frame rate conversion, and the like of the received image.

When the first image and the second image are received through the input 110, the processor 140 may insert image output information into at least one of a frame of a first predetermined interval in the first image and a frame of a second predetermined interval in the second image. Here, the image output image may include image identification information for distinguishing the first image and the second image from each other in the adjacent display device connected to the display device 100, and display setting information applied to the multi display system 1000.

The display setting information may refer, for example, to basic setting information for the display device 100 to display the image. For example, the display setting information may include, for example, and without limitation, brightness, contrast, sharpness, response time, screen size, transparency, gamma information, color space information, or the like of the display device 100. However, the display setting information is not limited thereto, but may also include additional information for displaying the image such as time information other than the basic setting information.

The processor 140 may alternately transmit the frame of the first interval and the frame of the second interval to the adjacent display device after inserting the image output information. In particular, the processor 140 may use one of even-numbered frames and odd-numbered frames of the first image as the frame of the first interval, and use one of even-numbered frames and odd-numbered frames of the second image as the frame of the second interval.

For example, the processor 140 may alternately transmit the even-numbered frames of the first image and the odd-numbered frames of the second image to the adjacent display device after inserting the image output information into the even-numbered frames of the first image. Accordingly, a frame rate of the first image and the second image may be reduced in half.

However, the first interval and the second interval are not limited thereto, but may be an interval of two or more frames. In addition, the first interval and the second interval may be different from each other. For example, if the frame rate of the first image is 60 Hz and the frame rate of the second image is 30 Hz, the frame may be extracted at an interval of two frames in the first image and the frame may be extracted at an interval of one frame in the second image. That is, the processor 140 may also determine the first interval and the second interval so that the number of frames used in the first image is equal to the number of frames used in the second image.

The processor 140 may also insert the image output information after processing the received first and second images. For example, when the first image and the second image are received, the processor 140 may process each of the received first and second images to correspond to the DP format. In this case, the processor 140 may perform a decoding, a scaling, a frame rate conversion, and the like of the received image.

For example, when the first image having the frame rate of 60 Hz and the second image having the frame rate of 30 Hz are received, the processor 140 may convert each of the images into an image of 24 Hz. In addition, the processor 140 may also insert the image output information into one of a frame of a first interval in the converted first image and a frame of a second interval in the converted second image. In this case, the first interval and the second interval may be the same as each other.

The processor 140 may control the display to display some regions of one of the frame of the first interval and the frame of the second interval based on display layout information. Here, the display layout information is stored in each of the plurality of display devices configuring the multi display system 1000, and the information stored in each display device may be all different. A detailed description thereof will be provided below.

As an example of the display layout information, the processor 140 may perform an image processing for only the frame of the first interval based on the display layout information. In addition, the processor 140 may determine which region of the frame of the first interval to display based on the display layout information. If the frame of the first interval is divided into 3×3 rectangular regions having the same size, the processor 140 may display only a rectangular region of a left upper end based on the display layout information.

In this case, the processor 140 may the same some regions with respect to all of the frames of the first interval. For example, in a case in which the processor 140 displays only the rectangular region of the left upper end with respect to the first frame, the processor 140 may also display the rectangular regions of the left upper end with respect to the remaining frames.

Meanwhile, the display device 100 may further include a storage in which the display layout information is stored. Here, the display layout information may include first information on a position of the display device 100 among the plurality of display devices configuring the multi display system 1000 and second information on the position of the display device 100 among the plurality of display devices configuring the PIP screen provided in the PIP mode, and the processor 140 may determine displayed regions of the image provided in each of the normal mode and the PIP mode based on the first information and the second information which are stored in the storage.

However, the processor 140 is not limited thereto, but may also receive the display setting information in real time. For example, the processor 140 may also receive the display layout information together with the image. The processor 140 may also receive the display layout information separately from the image.

Meanwhile, the image output information may include image identification information for identifying the first image and the second image, and the processor 140 may insert the image identification information by changing a pixel value of a pixel disposed at a predetermined position of one of the frame of the first interval and the frame of the second interval according to a predetermined reference.

For example, the processor 140 may insert the image identification information by changing a pixel value of at least one pixel disposed at one vertex of the frame of the first interval and the frame of the second interval based on at least one peripheral pixel value, and changing pixel values of the remaining pixels based on the changed pixel value.

In addition, the image output information may further include display setting information applied to the multi display system 1000, and the processor 140 may insert the display setting information by changing a pixel value of a pixel disposed at a predetermined position of the other of the frame of the first interval and the frame of the second interval, and display some regions of one of the frame of the first interval and the frame of the second interval based on the display setting information.

For example, the processor 140 may insert the display setting information by changing values of two sub-pixels of a R sub-pixel, a G sub-pixel, and a B sub-pixel of at least one pixel disposed at the other vertex of the frame of the first interval and the frame of the second interval based on the display setting information, and changing a sub-pixel value of the other of the R sub-pixel, the G sub-pixel, and the B sub-pixel based on the changed values of the two sub-pixels.

However, the image output information is not limited thereto, but may also include only the display setting information applied to the multi display system 1000. In this case, the processor 140 may insert the display setting information by changing the pixel value of the pixel disposed at the predetermined position of one of the frame of the first interval and the frame of the second interval, and may also display some regions of one of the frame of the first interval and the frame of the second interval based on the display setting information. That is, the processor 140 may not insert separate image identification information into the frames, and in this case, the processor 140 may distinguish the first image and the second image depending on whether or not the display setting information is detected.

Meanwhile, when the first image and the second image are received through the input 110, the processor 140 may transmit mode information instructing an operation in the PIP mode to the adjacent display device. That is, the processor 140 may transmit the frame of the first interval in the first image, the frame of the second interval in the second image, and the mode information to the adjacent display device. The adjacent display device may determine a mode of the multi display system 1000 based on the received mode information, and operate to correspond to the determined mode.

When one image is received through the input 110, the processor 140 may also transmit the processed image and mode information instructing an operation in the normal mode to the adjacent display device.

Meanwhile, the display device 100 may further include a communicator (not shown) including various communication circuitry for performing communication with an external server, and the processor 140 may request an additional image corresponding to the first image to the external server when the first image is received through the input 110, and set the addition image as the second image when the additional image is received from the external server.

For example, the processor 140 may request an advertisement image associated with the first image to the external server when the first image is received, and alternately transmit the frame of the first interval in the first image and the frame of the second interval in the advertisement image to the adjacent display device when the advertisement image is received from the external server.

The processor 140 may request additional information associated with the first image when the first image is received, and also generate the second image using the additional information when the additional information is received from the external server.

For example, the processor 140 may generate the second image to overlay with text information when the text information associated with the first information is received, and alternately transmit the frame of the first interval in the first image and the frame of the second interval in the second image to the adjacent display device.

Figure 2B:
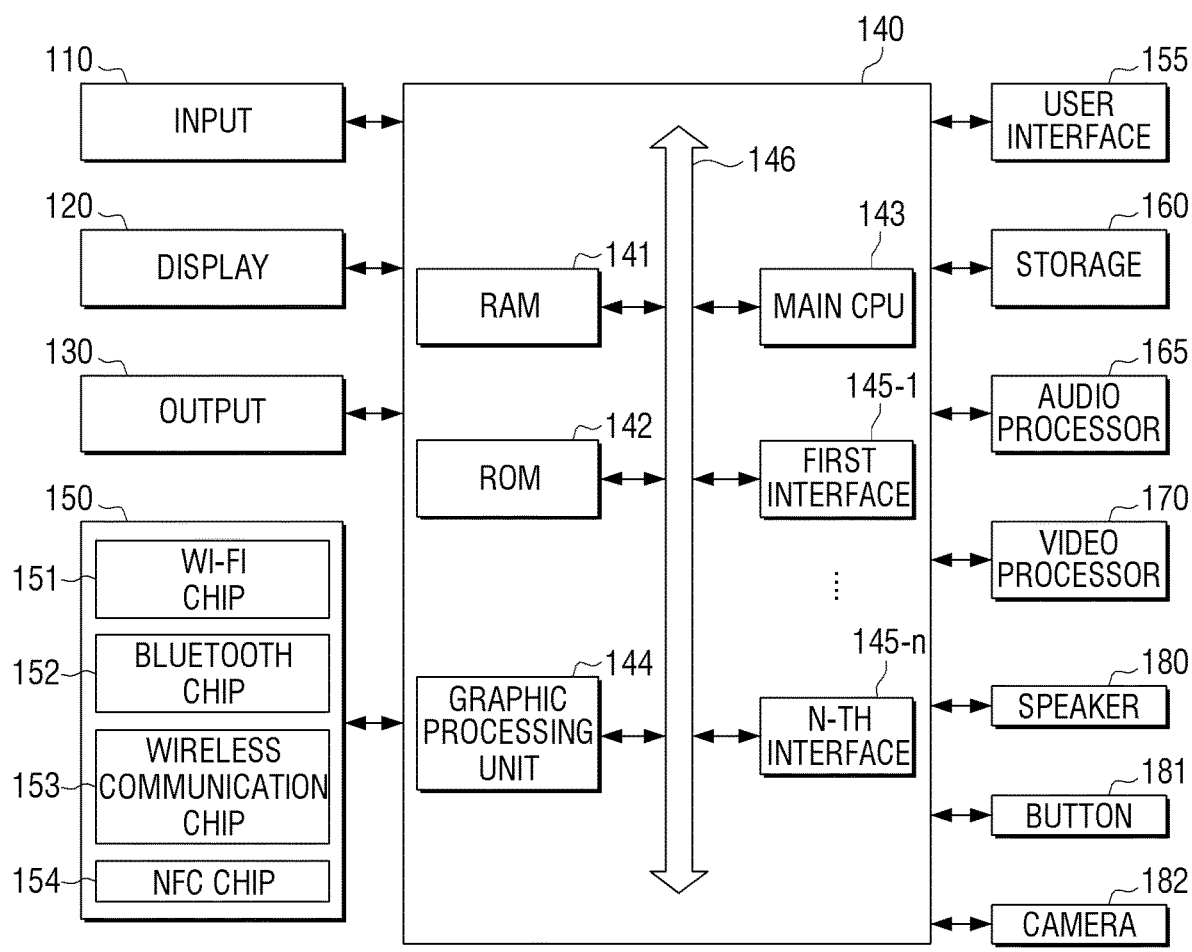
FIG. 2B is a block diagram illustrating one example of a configuration of the display device according to an example embodiment of the present disclosure.

FIG. 2B is a block diagram illustrating an example of a configuration of the display device 100. Referring to FIG. 2B, the display device 100 includes the input 110, the display 120, the output 130, the processor 140, the communicator (e.g., including communication circuitry) 150, a user interface (e.g., including user interface circuitry) 155, the storage 160, an audio processor (e.g., including audio processing circuitry) 165, a video processor (e.g., including video processing circuitry) 170, a speaker 180, a button 181, and a camera 182. A detailed description of the components overlapping with the components illustrated in FIG. 2A among the components illustrated in FIG. 2B will not be repeated here.

The processor 140 may include various processing circuitry and controls an overall operation of the display device 100 using, for example, a variety of programs stored in the storage 160.

The processor 140 may include a random access memory (RAM) 141, a read only memory (ROM) 142, a main central processing unit (CPU) 143, a graphic processing unit 144, first to n-th interfaces 145-1 to 145-n, and a bus 146.

The RAM 141, the ROM 142, the main CPU 143, the graphic processing unit 144, the first to n-th interfaces 145-1 to 145-n, and the like may be connected to each other through the bus 146.

The first to n-th interfaces 145-1 to 145-n are connected to the variety of components described above. One of the interfaces may be a network interface connected to an external device via a network.

The main CPU 143 accesses the storage 160 and performs a booting using an operating system (O/S) stored in the storage 160. In addition, the main CPU 143 performs various operations using a variety of programs stored in the storage 160.

The ROM 142 stores a set of instructions for booting a system, and the like. When a turn-on instruction is input to supply power, the main CPU 143 copies the O/S stored in the storage 160 in the RAM 141 according to the instructions stored in the ROM 142, and executes the O/S to boot the system. When the booting is completed, the main CPU 143 copies a variety of application programs stored in the storage 160 in the RAM 141, and executes the application programs copied in the RAM 141 to perform a variety of operations.

The graphics processing unit 144 generates a screen including various objects such as an icon, an image, a text, and the like using a calculator (not shown) and a renderer (not shown). The calculator (not shown) calculates attribute values such as coordinate values, shapes, sizes, colors, and the like in which the respective objects are to be displayed according to a layout of the screen based on a received control instruction. The renderer (not shown) generates a screen of various layouts including the objects based on the attribute values calculated by the calculator (not shown). The screen generated by the renderer (not shown) is displayed in a display region of the display 120.

Meanwhile, the operations of the processor 140 described above may be performed by the program stored in the storage 160.

The storage 160 may store a variety of data such as an operating system (O/S) software module for driving the display device 100, a display layout information module, and an operation module of the display device 100 for each of the modes.

In this case, the processor 140 may process and display the received image based on the information stored in the storage 160.

The communicator 150 may include various communication circuitry (including various chips that each include various communication circuitry) for performing communication with various types of external devices according to various types of communication schemes. The communicator 150 may include, for example, and without limitation, a Wi-Fi chip 151, a Bluetooth chip 152, a wireless communication chip 153, and a near field communications (NFC) chip 154, or the like. The processor 140 performs communication with a variety of external devices using the communicator 150.

The Wi-Fi chip 151 and the Bluetooth chip 152 perform the communication in a Wi-Fi scheme and a Bluetooth scheme, respectively. In the case in which the Wi-Fi chip 151 or the Bluetooth chip 152 is used, a variety of access information such as SSID, a session key, and the like may be first transmitted and received, a communication access may be performed using the variety of access information, and a variety of information may be then transmitted and received. The wireless communication chip 153 means a chip that performs communication according to various communication standards such as IEEE, ZigBee, 3rd generation (3G), 3rd generation partnership project (3GPP), Long Term Evolution (LTE), and the like. The NFC chip 154 means a chip which is operated in a NFC scheme that uses a frequency band of 13.56 MHz among various RF-ID frequency bands such as 135 kHz, 13.56 MHz, 433 MHz, 860 to 960 MHz, 2.45 GHz, and the like.

Meanwhile, the communicator 150 may perform one-way communication or bidirectional communication with the external devices. In a case in which the communicator 150 performs the one-way communication, the communicator 150 may receive signals from the external devices. In a case in which the communicator 150 performs the bidirectional communication, the communicator 150 may also receive the signals from the external devices and may also transmit the signal to the external devices.

The user interface 155 may include various user interface circuitry and/or program elements and receives various user interactions. Here, the user interface 155 may be implemented in various forms according to an implementation example of the display device 100. In a case in which the display device 100 is implemented as a digital TV, the user interface 155 may be implemented, for example, and without limitation, as a remote controller receiver receiving a remote controlling signal from a remote controller, a camera sensing a user motion, a microphone receiving a user voice, or the like. In addition, in a case in which the display device 100 is implemented as a touch based electronic device, the user interface 155 may also be implemented as a touch screen form forming a mutual layer structure with a touch pad. In this case, the user interface 155 may be used as the display 120 described above.

The audio processor 165 may include various audio processing circuitry for performing a processing for audio data. The audio processor 165 may perform various processes such as, for example, and without limitation, decoding, amplification, noise filtering, or the like, for the audio data.

The video processor 170 may include various video processing circuitry for performing a processing for video data. The video processor 170 may perform various image processes such as, for example, and without limitation, decoding, scaling, noise filtering, frame rate conversion, resolution conversion, or the like for the video data.

The speaker 180 may be a component outputting a variety of alarm sounds or voice messages as well as a variety of audio data processed by the audio processor 165.

The button 181 may be various types of buttons such as, for example, and without limitation, a mechanical button, a touch pad, a wheel, or the like formed in any region of a front part, a side part, a rear part, or the like of the exterior of a body of the display device 100.

The camera 182 may include various circuitry and components for photographing a still image or a moving image according to a control of the user. The camera 182 may be implemented by a plurality of cameras such as a front camera and a rear camera.

As described above, the processor 140 may receive the plurality of images and perform the image processing for operating the multi display system 1000 in the PIP mode.

Hereinafter, the operation of the display device 100 will be described in greater detail with reference to various drawings.

FIGS. 3A, 3B and 3C are diagrams illustrating a method for inserting image output information according to various example embodiment of the present disclosure.

When the first image and the second image are received through the input 110, the processor 140 may insert image output information into at least one of frames of a first predetermined interval in the first image and frames of a second predetermined interval in the second image.

FIG. 3A is a diagram illustrating a method for inserting image identification information according to an example embodiment of the present disclosure. The processor 140 may insert image identification information to distinguish the first image and the second image from each other, as illustrated in FIG. 3A. The remaining display devices except for the first display device 100 in the multi display system 1000 may sequentially receive the frames. In this case, the remaining display devices may distinguish the frames from each other, but may not distinguish which frame is the first image or the second image. Accordingly, the processor 140 may insert the image identification information into some frames so that the remaining display devices may distinguish whether the received frame is included in any image of the first image and the second image.

For example, the processor 140 may insert the image identification information into all of the even-numbered frames of the first image. In this case, the remaining display devices may determine that the frames into which the image identification information is inserted among the received frames are the first image.

The processor 140 may also insert the image identification information into all of the odd-numbered frames of the second image. The processor 140 may insert first image identification information into all of the even-numbered frames of the first image, and may also insert second image identification information into all of the odd-numbered frames of the second image.

Here, the processor 140 may insert the image identification information into only the frame to be transmitted to the adjacent display device. For example, when the processor 140 alternately transmits all of the even-numbered frames in the first image and all of the odd-numbered frames in the second image to the adjacent display device, the processor may insert the image identification information into at least one of the all of the even-numbered frame of the first image and the all of the odd-numbered frames of the second image, and may not insert the image identification information into all of the odd-numbered frames of the first image and all of the even-numbered frames of the second image.

Meanwhile, the display device 100 and the remaining display devices may share information on the image identification information. For example, in a case in which the processor 140 inserts the image identification information into all of the even-numbered frames of the first image, the remaining display devices may determine that the frames into which the image identification information is inserted among the received frames are the first image.

The processor 140 may insert the image identification information by changing a pixel value of a pixel disposed at a predetermined position of one of a frame of a first interval and a frame of a second interval according to a predetermined reference.

For example, the processor 140 may insert the image identification information by changing a pixel value of at least one pixel disposed at one vertex of the frame of the first interval and the frame of the second interval base on at least one peripheral pixel value, and changing pixel values of the remaining pixels based on the changed pixel value. FIG. 3A is a diagram in which an example method is applied to one frame.

The processor 140 may change pixel values of a left upper end pixel P1 310-1, a right upper end pixel P2 320-1, and a left lower end pixel P3 330-1 based on at least one peripheral pixel value as in the following Mathematical Expression 1.

$$Pn'=\sim[(Pnx+Pny)/2], n=1,2,3 \qquad \text{[Mathematical Expression 1]}$$

~X is a not bit operation of X.

The processor 140 may change the pixel values of the pixels P1 310-1, P2 320-1, and P3 330-1 to pixel values of pixels P1' 310-2, P2' 320-2, and P3' 330-2, respectively, based on Mathematical Expression 1.

In addition, the processor 140 may change a pixel value of a right lower end pixel P4 340-1 based on the changed pixel value as in the following Mathematical Expression 2.

$$P4'=255-(P1'+P2'+P3')\% \ 256 \qquad \text{[Mathematical Expression 2]}$$

A % B is the remainder when A is divided by B.

The processor 140 may change the pixel value of the pixel P4 340-1 to a pixel value of a pixel P4' 340-2 based on Mathematical Expression 2.

FIG. 3A is merely an example of inserting the image identification information, and the image identification information may also be inserted in any other method.

Meanwhile, FIG. 3A illustrates that the pixel values of the pixels disposed at vertexes of the frame are changed, but the present disclosure is not limited thereto, and the processor 140 may also insert the image identification information by changing pixel values of pixels disposed at any other positions.

FIGS. 3B and 3C are diagrams illustrating a method for inserting display setting information according to an example embodiment of the present disclosure.

FIG. 3B is a diagram illustrating pixels into which the display setting information is inserted for each of the sub-pixels according to an example embodiment of the present disclosure. P1' to P4' in FIG. 3B are the same as P1' to P4' in FIG. 3A. However, the present disclosure is not limited thereto, and the processor 140 may also insert the display setting information using pixels at any other positions.

The processor 140 may change sub-pixels values of a R sub-pixel and a G sub-pixel of each of the pixels P1' to P4' disposed at positions of vertexes based on the display setting information. For example, the processor 140 may change Rn and Gn sub-pixels to Rn' and Gn' sub-pixels, respectively, based on the display setting information. Here, n means an n-th pixel.

In general, each sub-pixel is represented in data of 8 bits, and in this case, one pixel may store data of 16 bits. In addition, when all of the four pixels disposed at the positions of the vertexes are used, the four pixels may store data of a total of 64 bits. A detailed method for storing the display setting information will be described with reference to FIG. 3C.

The processor 140 may change a sub-pixel value of a B sub-pixel based on the changed values of the R sub-pixel and the G sub-pixel of each of the pixels P1' to P4' disposed at the positions of the vertexes. For example, the processor 140 may change the sub-pixel value of the B sub-pixel as in the following Mathematical Expression 3.

$$Bn' = 255 - (Rn' + Gn') \% 256$$ [Mathematical Expression 3]

Here, n is the pixel number, Rn' is a changed value of the R sub-pixel of the n-th pixel, Gn' is a changed value of the G sub-pixel of the n-th pixel, Bn' is a changed value of the B sub-pixel of the n-th pixel, and A % B is the remainder when A is divided by B.

Meanwhile, the display device 100 and the remaining display devices may share information for insertion and sensing of the display setting information. For example, when a relationship as in Mathematical Expression 3 is established between the sub-pixel values of the predetermined pixel, the adjacent display device may recognize that it is the frame into which the display setting information is inserted, and restore the display setting information.

Meanwhile, although FIG. 3B illustrates that the display setting information is inserted into the R sub-pixel and the G sub-pixel, and the B sub-pixel is changed to data for cyclical redundancy check, the present disclosure is not limited thereto and the processor 140 may also change the sub-pixel values to any other combinations.

FIG. 3C is a diagram illustrating a case in which sub-pixel values of two sub-pixels are changed based on time information according to an example embodiment of the present disclosure. Data1 to data8 in FIG. 3C are the same as data1 to data8 in FIG. 3B.

The processor 140 may store header information representing a type of the display setting information and a data size in a predetermined sub-pixel among the sub-pixels in which the display setting information is stored.

For example, as illustrated in FIG. 3C, the processor 140 may store the header information in one sub-pixel of a first pixel of four pixels disposed at positions of vertexes.

In addition, the processor 140 may store a type of the display setting information among the header information using a predetermined number of bits in the entire bits of one sub-pixel, and store the data size among the header information using the remaining bits.

For example, as illustrated in FIG. 3C, the processor 140 may store the type of the display setting information among the header information using the first 5 bits in a total of 8 bits of one sub-pixel, and store the data size among the header information using the remaining 3 bits.

The processor 140 may store the display setting information corresponding to the header information in the remaining sub-pixels except for the sub-pixel in which the header information is stored. For example, the processor 140 may input year information to a data2, input month information to a data3, input day information to a data4, input time information to a data5, input minute information to a data6, and input second information to a data7.

The processor 140 may input each information to the data 2 to the data7, and leave the remaining bits in a reserve region. In addition, the processor 140 may leave a bit of a data8 in the reserve region.

Although FIG. 3C describes that the time information is input, this is merely an example, and any other display setting information may be stored. Meanwhile, a position in which the header information and the display setting information corresponding to the header information are stored may also be changed differently.

In addition, although FIG. 3C describes that only one kind of information is input to each of the data2 to the data7, the present disclosure is not limited thereto, and the processor 140 may also sequentially store a plurality of kinds of information in the data2 to the data7 without the reserve region.

Meanwhile, although it is described that the display setting information is input to the four pixels, the present disclosure is not limited thereto, and the processor 140 may also use any other number of pixels based on a size of the display setting information.

For example, the processor 140 may store information on the size of the display setting information stored in the corresponding frame in a pixel disposed at a position of the leftmost vertex. Specifically, the processor 140 may store that the display setting information is stored in the corresponding frame through 20 pixels in the pixel disposed at the position of the leftmost vertex. In this case, the adjacent display device may restore the display setting information from a predetermined number of 20 pixels.

Figure 4:
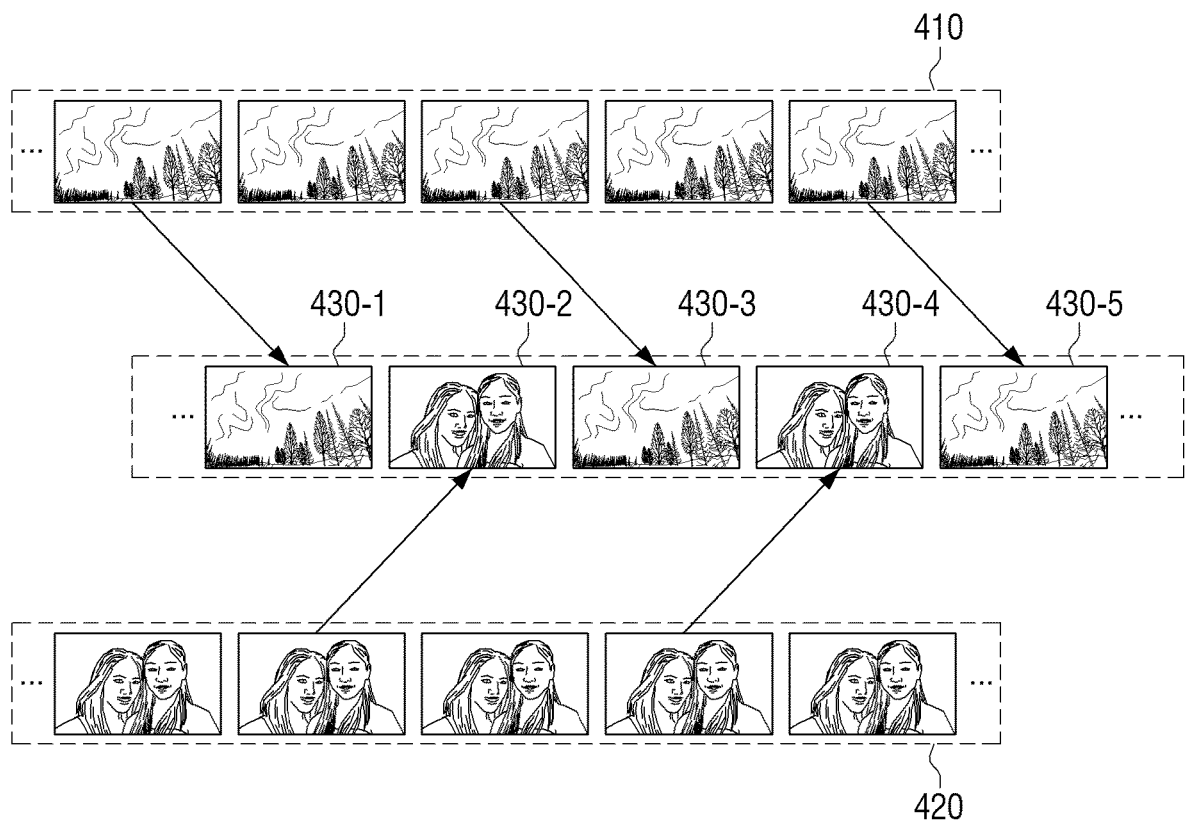
FIG. 4 is a diagram illustrating a method for alternately transmitting a frame of a first interval in a first image and a frame of a second interval in a second image to an adjacent display device according to an example embodiment of the present disclosure.

FIG. 4 is a diagram illustrating a method for alternately transmitting a frame of a first interval in a first image and a frame of a second interval in a second image to an adjacent display device according to an example embodiment of the present disclosure.

As illustrated in FIG. 4, the processor 140 may sequentially receive frames of a first image 410 and frames of a second image 420. In addition, the processor 140 may alternately transmit odd-numbered frames 430-1, 430-3, and 430-5 in the first image 410, and even-numbered frames 430-2 and 430-4 in the second image 420 to an adjacent display device.

However, this is merely an example, and the processor 140 may also transmit the frames to the adjacent display device in any other method. That is, the processor 140 may use one of even-numbered frames and odd-numbered frames of the first image 410 as a frame of a first interval, and use one of even-numbered frames and odd-numbered frames of the second image 420 as a frame of a second interval.

The processor 140 may alternately transmit first, second, fifth, sixth, ninth, and tenth frames of the first image 410 and first, second, fifth, sixth, ninth, and tenth frames of the second image 420 to the adjacent display device. For example, the first interval and the second interval may be determined differently.

Meanwhile, the processor 140 may alternately transmit the frames of the first interval in the first image 410 and the frames of the second interval in the second image 420 to the adjacent display device, and may additionally transmit mode information instructing an operation in a PIP mode to the adjacent display device. For example, the adjacent display device may determine an image to be displayed based on the mode information. This will be described below.

Meanwhile, the processor 140 may insert the image identification information by changing a pixel value of a pixel disposed at a predetermined position of one of the frames of the first interval and the frames of the second interval, and may insert the display setting information by changing a pixel value of a pixel disposed at a predetermined position of the other of the frames of the first interval and the frames of the second interval.

For example, the processor 140 may insert the image identification information by changing a pixel value of a pixel disposed at a predetermined position of the odd-numbered frames 430-1, 430-3, and 430-5 in the first image 410, and may insert the display setting information by changing a pixel value of a pixel disposed at a predetermined position of the even-numbered frames 430-2 and 430-4 in the second image.

In addition, the processor 140 may alternately transmit the odd-numbered frames 430-1, 430-3, and 430-5 in the first image 410 into which the image identification information is inserted, and the even-numbered frames 430-2 and 430-4 in the second image 420 into which the display setting information is inserted to an adjacent display device.

In this case, the adjacent display device may distinguish the first image 410 and the second image 420 by detecting the image identification information from the odd-numbered frames 430-1,430-3, and 430-5 of the first image 410. In addition, the adjacent display device may detect the display setting information from the even-numbered frames 430-2 and 430-4 of the second image 420, and may display some regions of one of the odd-numbered frames 430-1, 430-3, and 430-5 of the first image 410 and the even-numbered frames 430-2 and 430-4 of the second image 420 based on the detected display setting information.

Although it is described that the image output information includes the image identification information and the display setting information, this is merely an example, and the image output information may also include only the display setting information. In this case, the processor 140 may insert the display setting information by changing the pixel value of the pixel disposed at the predetermined position of one of the frames of the first interval and the frames of the second interval, and may also display some regions of one of the frames of the first interval and the frames of the second interval based on the display setting information.

For example, the processor 140 may insert the display setting information by changing the pixel value of the pixel disposed at the predetermined position of the odd-numbered frames 430-1, 430-3, and 430-5 of the first image 410.

In addition, the processor 140 may alternately transmit the odd-numbered frames 430-1, 430-3, and 430-5 of the first image 410 into which the display setting information is inserted, and the even-numbered frames 430-2 and 430-4 of the second image 420 into which the information is not inserted to an adjacent display device.

In this case, the adjacent display device may distinguish the first image 410 and the second image 420 by detecting the display setting information from the odd-numbered frames 430-1,430-3, and 430-5 of the first image 410. That is, the processor 140 may identify the frame from which the display setting information is detected as the first image 410.

In addition, the adjacent display device may display some regions of one of the odd-numbered frames 430-1, 430-3, and 430-5 of the first image 410 and the even-numbered frames 430-2 and 430-4 of the second image 420 based on the detected display setting information.

Meanwhile, the processor 140 may also insert the display setting information by using only a predetermined number of frames. For example, if the display setting information may be all inserted into one frame, the processor 140 may insert the display setting information by changing a pixel value of a pixel disposed at a predetermined position of a first odd-numbered frame 430-1 of the odd-numbered frames 430-1, 430-3, and 430-5 of the first image 410. In addition, the processor 140 may insert the image identification information into the remaining odd-numbered frames 430-3 and 430-5 of the odd-numbered frames 430-1, 430-3, and 430-5 of the first image 410.

The processor 140 may insert the display setting information by changing a pixel value of a pixel disposed at a predetermined position of a first odd-numbered frame 430-1 of the odd-numbered frames 430-1, 430-3, and 430-5 of the first image 410, and may also insert the image identification information into the even-numbered frames 430-2 and 430-4 of the second image 420.

Figure 5A:
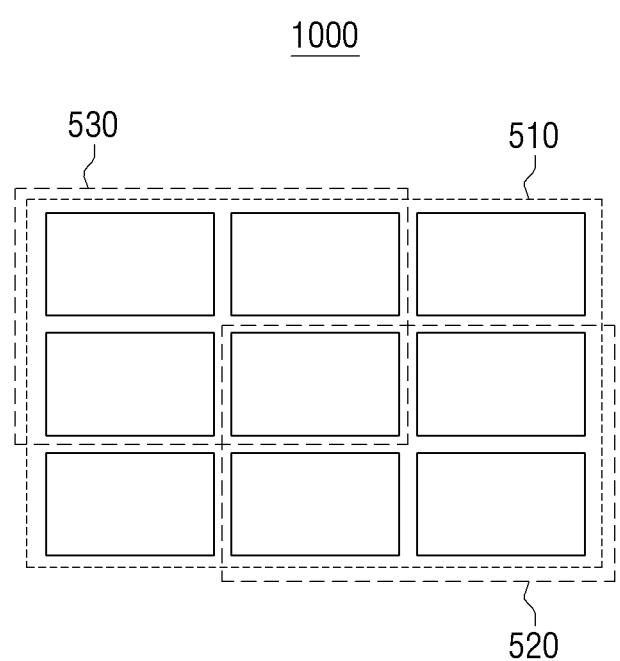
FIGS. 5A, 5B and 5C are diagrams illustrating a display of an image in a picture in picture (PIP) mode according to an example embodiment of the present disclosure.
Figure 5B:
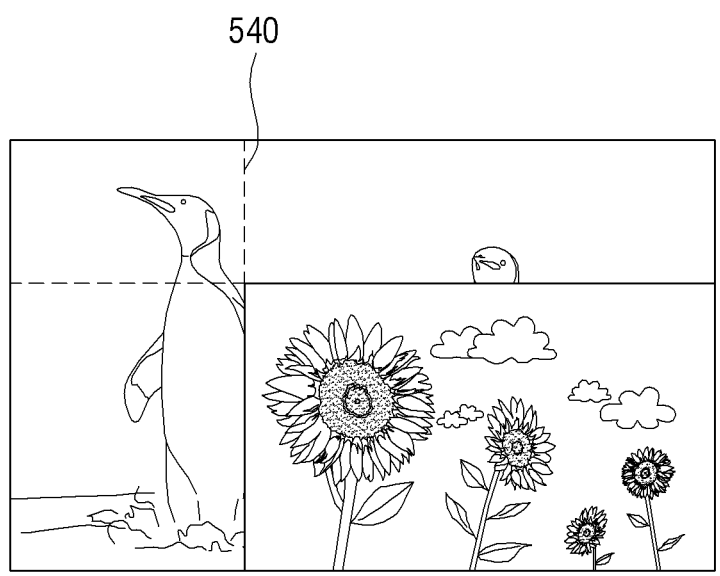
Figure 5C:
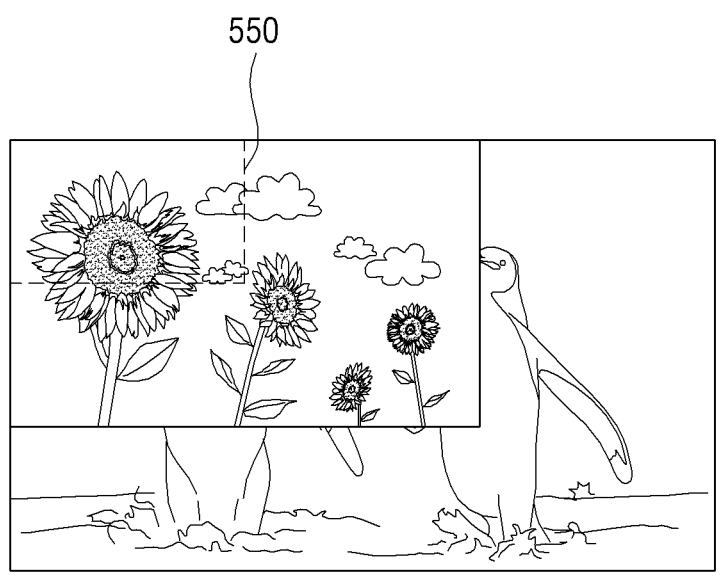

FIGS. 5A, 5B and 5C are diagrams illustrating a display of an image in a picture in picture (PIP) mode according to an example embodiment of the present disclosure. It is assumed that the multi display system 1000 includes a plurality of display devices of 3×3, and a display device of a left upper end is the display device 100 receiving a plurality of images from source device.

As illustrated in FIG. 5A, the multi display system 1000 may display an image received in a normal mode on a full screen 510. The multi display system 1000 may display a sub-image in a first PIP mode on a first PIP screen 520, and may display one region of a main image on a screen except for the first PIP screen 520 from the full screen 510. In this case, one region of the main image may be a region of the main image except for a region covered by the sub-image, in a state in which the main image is displayed on the full screen 510 and the sub-image is displayed to be overlaid with the first PIP screen 520.

The multi display system 1000 may display a sub-image in a second PIP mode on a second PIP screen 530, and may display one region of the main image on a screen except for the second PIP screen 530 from the full screen 510. In this case, one region of the main image may be a region of the main image except for a region covered by the sub-image, in a state in which the main image is displayed on the full screen 510 and the sub-image is displayed to be overlaid with the second PIP screen 530.

That is, the multi display system 1000 may also provide a plurality of PIP modes depending on where the PIP screen is provided on the full screen.

The display device 100 may further include a storage 160 in which display layout information is stored. Here, the display layout information may include first information on a position of the display device 100 of the plurality of display devices configuring the multi display system 1000, and second information on a position of the display device of the plurality of display devices configuring the first PIP screen 520 provided in the first PIP mode.

For example, in the case of the first PIP mode, the storage 160 may include the first information and the second information as follows.

First Information: main (1, 1)/(3, 3)
Second Information: sub n/a

Here, the first information means that the display device 100 is positioned at a first row and a first column in the multi display system 1000 of 3×3, and the second information means it is not used as the PIP screen.

The processor 140 may determine a displayed region of the image in each of the normal mode and the PIP mode based on the first information and the second information stored in the storage 160.

For example, the processor 140 may divide the main image into nine regions of 3×3 in the normal mode, and may display a left upper end region. The processor 140 may determine that the display device displaying the sub-image in the first PIP mode is not the display device 100. In addition, the processor 140 may divide the main image into nine regions of 3×3, and may display a left upper end region.

FIG. 5B illustrates such an example, and the processor 140 may display a left upper end region 540 of the main image of the main image (a penguin image) and the sub-image (a flower image) in the first PIP mode.

Meanwhile, in the case of the second PIP mode, the storage 160 may include first information and second information as follows.

First Information: main (1, 1)/(3, 3)
Second Information: sub (1, 1)/(1~2, 1~2)

Here, the first information means that the display device 100 is positioned at a first row and a first column in the multi display system 1000 of 3×3, and the second information means that a plurality of display devices from a first row to a second row and from a first column to a second column are devices providing the PIP screen, and the display device 100 is positioned at the first row and the first column among them.

For example, the processor 140 may divide the main image into nine regions of 3×3 in the normal mode, and may display a left upper end region. Alternatively, the processor 140 may divide the sub-image into four regions of 2×2 in the second PIP mode, and may display a left upper end region.

FIG. 5C illustrates such an example, and the processor 140 may display a left upper end region 550 of the sub-image of the main image (a penguin image) and the sub-image (a flower image) in the second PIP mode.

In this case, the processor 140 may display the image without distinguishing the first image and the second image using the image identification information unlike the remaining display devices of the multi display system 1000. The remaining display devices may not distinguish the first image and the second image from the received frames without the image identification information, but the display device 100 does not need to distinguish the first image and the second image using the image identification information because it directly receives the first image and the second image. Meanwhile, as described above, the remaining display devices may also distinguish the first image and the second image using the display setting information.

Meanwhile, since the display device 100 receives the first image and the second image, it may store an original image before the image output information is inserted. Accordingly, the processor 140 may display some regions of one of the frames of the first interval in the first image and the frames of the second interval in the second image before the image output information is inserted. The adjacent display device may restore the pixel into which the image output information is inserted and display it, and this will be described below.

Meanwhile, although FIGS. 5A to 5C describe the multi display system 1000 of 3×3 as an example, the present disclosure is not limited thereto, and technical characteristics of the present disclosure may be applied to the multi display system 1000 having any other configurations.

In addition, the multi display system 1000 may also provide any type of PIP mode as well as the first PIP mode and the second PIP mode.

In addition, the type of the first information and the second information stored in the storage 160 is merely one example, and the first information and the second information may also be stored in any type of information.

Meanwhile, although it is described that the mode of the multi display system 1000 is determined according to the user command, the present disclosure is not limited thereto, and the processor 140 may also automatically change mode information based on the number of the received images.

For example, the processor 140 may transmit a signal instructing an operation in the normal mode to the adjacent display device when one image is received, and may transmit a signal instructing an operation in the PIP mode to the adjacent display device when the first image and the second image are received.

As described above, the display device 100 may receive the first image and the second image and perform an image processing, thereby providing the image-processed image to the adjacent display device.

Meanwhile, hereinabove, although the display device 100 receives the plurality of images, inserts the image output information thereto, and transmits the plurality of images into which the image output information is inserted to the adjacent display device, the present disclosure is not limited thereto.

For example, the display device 100 may also receive only one image. The processor 140 may insert the image output information into the received image, and may also transmit the image into which the image output information is inserted to the adjacent display device. In this case, the image output information may also include only the display setting information. The adjacent display device may restore the display setting information, and display some regions of the image based on the display setting information.

That is, the display device 100 may transmit the display setting information to the remaining display devices included in the multi display system 1000, and all of the display devices included in the multi display system 1000 may display an image having uniform image quality based on the same display setting information.

The user may input the display setting information to only one display device 100, and the remaining display devices are automatically interworked with the display setting information of the display device 100, thereby making it possible to secure operation easiness of the user.

Hereinafter, an operation of the adjacent display device will be described.

<Remaining Display Devices in Multi Display System 1000>

Figure 6:
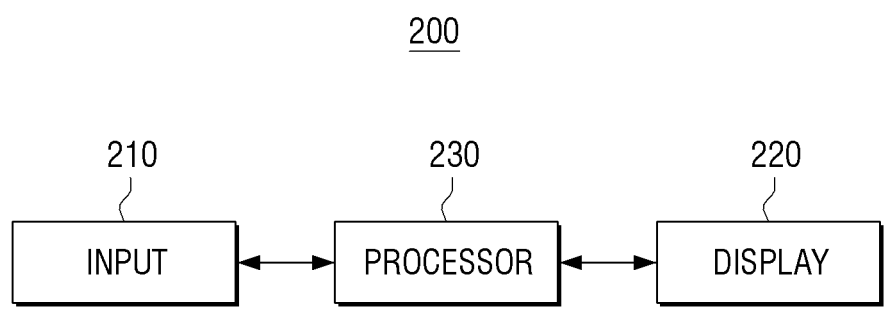
FIG. 6 is a block diagram illustrating a configuration of a display device according to another example embodiment of the present disclosure.

FIG. 6 is a block diagram illustrating a configuration of a display device 200 according to another example embodiment of the present disclosure.

Referring to FIG. 6, a display device 200 includes an input 210, a display 220, and a processor (e.g., including processing circuitry) 230.

The input 210 may be the same as the input 110 of the display device 100 in hardware. However, the input 210 does not receive the plurality of images from the source device, but may receive the images from the adjacent display device connected to the display device 200.

Here, the image may be an image in which frames of a first predetermined interval in the first image and frames of a second predetermined interval in the second image are alternately disposed, and image output information is inserted into at least one of the frames of the first interval and the frames of the second interval. That is, the received input may be an image generated by the first display device 100.

The display 220 may be a configuration for displaying the image processed by the processor 230. The display 220 may be implemented as, for example, and without limitation, a cathode ray tube (CRT), a liquid crystal display (LCD), a light emitting diode (LED), and a plasma display panel (PDP), or the like, but is not limited thereto. In addition, the display 220 may also be implemented as a flexible display, a transparent display, or the like, as needed.

The processor 230 may include various processing circuitry for controlling an overall operation of the display device 200.

The processor 230 may distinguish the frames of the first interval and the frames of the second interval by detecting the image output information from the frames configuring the received image. For example, the processor 230 may detect image identification information among the image output image based on a pixel value of a pixel disposed at a predetermined position in the frames configuring the received image. As described above, the processor 230 may also distinguish the frames of the first interval and the frames of the second interval depending on whether or not the display setting information is detected.

In addition, the processor 230 may display some regions of one of the frames of the first interval and the frames of the second interval based on display layout information.

Here, the display device 200 further include a storage in which the display layout information is stored, the display layout information may include first information on a position of the display device 200 among the plurality of display devices configuring the multi display system 1000 and second information on the position of the display device 200 among the plurality of display devices configuring the PIP screen provided in the PIP mode, and the processor 230 may determine displayed regions of the image provided in each of the normal mode and the PIP mode based on the first information and the second information which are stored in the storage.

Here, the image output information may include image identification information for identifying the first image and the second image, and the processor 230 may detect the image identification information based on a pixel value of a pixel disposed at a predetermine position in the frames configuring the received image and distinguish the frames of the first interval and the frames of the second interval based on the image identification information.

In addition, the image output information may further include display setting information applied to the multi display system 1000, and the processor 230 may detect the display setting information based on pixel values of a R sub-pixel, a G sub-pixel, and a B sub-pixel of each of one or more pixels disposed at a predetermined position in the frames configuring the received image, and may display some regions of one of the frames of the first interval and the frames of the second interval based on the display setting information.

Meanwhile, the image output information may further include display setting information applied to the multi display system 1000, and the processor 230 may detect the display setting information based on pixel values of a R sub-pixel, a G sub-pixel, and a B sub-pixel of each of one or more pixels disposed at a predetermined position in the frames configuring the received image, may distinguish the frames of the first interval and the frames of the second interval depending on whether or not the display setting information is detected, and may display some regions of one of the frames of the first interval and the frames of the second interval based on the display setting information.

Meanwhile, the display device 200 may further include an output (not shown). The output may be the same as the output 130 of the display device 100 in hardware. However, the output may output the image received through the input 210 as it is without the image processing.

Figure 7A:
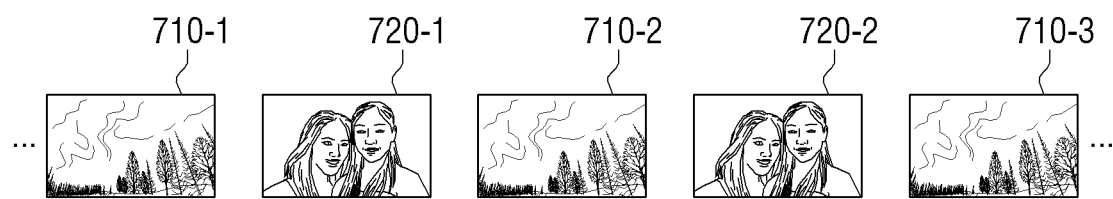
Figure 7B:
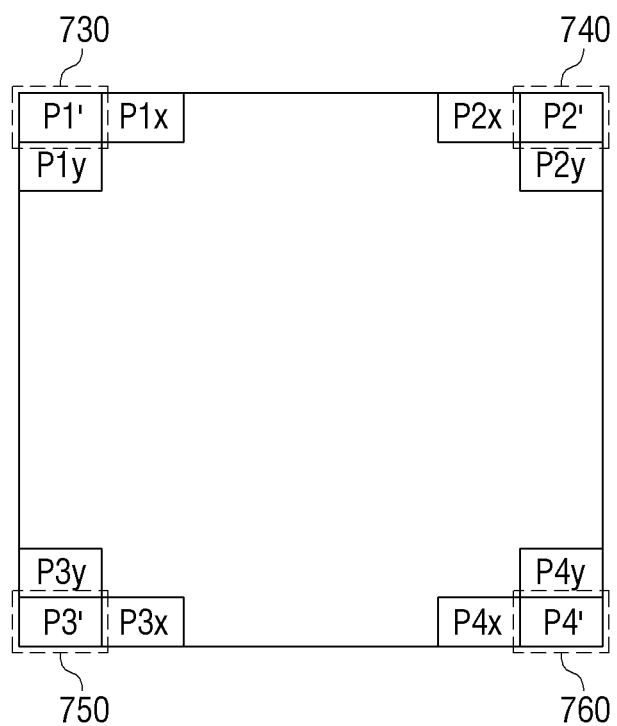

FIGS. 7A, 7B and 7C are diagrams illustrating a method for detecting image output information from received image.

As illustrated in FIG. 7A, the image may be an image in which frames 710-1, 710-2, and 710-3 of a first interval predetermined in a first image and frames 720-1 and 720-2 of a second interval predetermined in a second image are alternately disposed, and image output information is inserted into at least one of the frames of the first interval and the frames of the second interval.

When the image is received, the processor 230 may perform an operation for detecting the image output information from each of the frames. FIG. 7B is a diagram illustrating a method for detecting, by the processor 230, the image identification information when the image identification information is inserted as illustrated in FIG. 3A.

The processor 230 may operate whether or not each of the pixel values of pixels P1' 730, P2' 740, and P3' 750 is an average value of one or more peripheral pixel values. In addition, the processor 230 may determine whether or not an equal mark is established by inputting the pixel values of the pixels P1' 730, P2' 740, P3' 750, and P4' 760 to the following Mathematical Expression 4.

$$P4'=255-(P1'+P2'+P3')\% 256 \qquad \text{[Mathematical Expression 4]}$$

A % B is the remainder when A is divided by B.

In a case in which the pixel values of the pixels P1' 730, P2' 740, P3' 750, and P4' 760 meet the condition, the processor 230 may determine that the image identification information is inserted into the corresponding frame. The processor 230 may distinguish the frames of the first interval of the first image and the frames of the second interval of the second image depending on whether or not the image identification information is inserted.

FIG. 7C is a diagram illustrating a method for detecting, by the processor 230, the display setting information when the display setting information is inserted as illustrated in FIG. 3B.

First, the processor 230 may determine whether or not an equal mark is established by inputting sub-pixel values of a R sub-pixel and a G sub-pixel and a sub-pixel value of a B sub-pixel of the pixel P1' to the following Mathematical Expression 5.

$$Bn'=255-(Rn'+Gn')\%256 \qquad \text{[Mathematical Expression 5]}$$

Here, n is the pixel number, Rn' is a sub-pixel value of the R sub-pixel of the n-th pixel, Gn' is a sub-pixel value of the G sub-pixel of the n-th pixel, Bn' is a sub-pixel value of the B sub-pixel of the n-th pixel, and A % B is the remainder when A is divided by B.

The processor 230 may perform such a process from the pixel P1' to the pixel P4'. Alternatively, the processor 230 may also determine whether or not the equal mark of Mathematical Expression 5 is established in a predetermined order for the plurality of pixels until the equal mark is not established.

For example, the processor 230 may sequentially determine whether or not the equal mark of Mathematical Expression 5 is established from the pixel P1'. If the equal mark of Mathematical Expression 5 is not established for the pixel P4', the processor 230 may determine that the display setting information is stored in the pixels P1' to P3'.

Alternatively, the processor 230 may also determine that the display setting information is stored in the pixels P1' to P3' based on the header information stored in the pixel P1'. In this case, the processor 230 may determine whether or not the equal mark of Mathematical Expression 5 is established and then perform a check process for the pixels P1' to P3', and may not determine whether or not the equal mark of Mathematical Expression 5 is established for the pixel P4'.

The processor 230 may also not perform the check process for the pixels P2' and P3'. That is, the processor 230 may determine whether or not the equal mark of Mathematical Expression 5 is established for only the pixel P1', and may also restore the display setting information from the remaining pixels based on the header information stored in the pixel P1'.

The display device 200 may store information on how the display device 100 inserts the image output information. The processor 230 may determine whether or not all of the equal marks of Mathematical Expression 4 and Mathematical Expression 5 are established for each of the received frames or may determine whether or not only the equal mark of Mathematical Expression 5 is established for each of the received frames, based on the method for inserting the image output information by the display device 100.

For example, when the display device 100 inserts the image identification information into the frames of the first interval in the first image and inserts the display setting information into the frames of the second interval in the second image, the processor 230 may determine whether or not all of the equal marks of the Mathematical Expression 4 and Mathematical Expression 5 are established for each of the received frames.

When the display device 100 inserts only the display setting information into any one of the frames of the first interval in the first image and the frames of the second interval in the second image, the processor 230 may determine whether or not only the equal mark of the Mathematical Expression 5 is established for each of the received frames.

In this case, the processor 230 may distinguish the first image and the second image depending on whether or not the display setting information is inserted, and may display some regions of any one of the frames of the first interval and the frames of the second interval based on the display setting information.

The processor 230 may display some regions of one of the frames of the first interval of the first image and the frames of the second interval of the second image based on display layout information stored in the storage. The display layout information stored in the storage and the operation of the processor 230 are the same as those in FIGS. 5A to 5C, and thus will not be described.

Meanwhile, the processor 230 may restore a pixel value of a pixel into which the image output information is inserted based on a pixel value of an adjacent pixel. Referring to the drawing illustrated in FIG. 7B, the processor 230 may restore a pixel disposed at a position of a vertex using the following Mathematical Expression 6.

$$Pn''=(Pnx+Pny)/2 \quad \text{[Mathematical Expression 6]}$$

Here, n is the pixel number.

Pn" may have the pixel value which is different from Pn before the image output information is inserted. However, since this is an average value of peripheral pixels, it is possible to minimize awareness of difference of the user.

Meanwhile, hereinabove, although it is described that the first display device transmits the mode information and the remaining display devices determine the mode based on the received mode information, the present disclosure is not limited thereto.

For example, the processor 230 may determine that the multi display system 1000 operates in the normal mode when the image output information is not detected from each of the frames of the received image, and may also determine that the multi display system 1000 operates in the PIP mode when the image identification information is detected. Further, even though the image identification information is not detected, when the display identification information is alternately detected in the received frames, the processor 230 may also determine that the multi display system 1000 operation in the PIP mode.

FIG. 8 is a flowchart illustrating a method of controlling a display device 100 according to an example embodiment of the present disclosure.

A first image and a second image are received (S810). In addition, image output information is inserted into at least one of frames of a first predetermined interval in the first image and frames of a second predetermined interval in the second image (S820). In addition, the frames of the first interval and the frames of the second interval are alternately transmitted to an adjacent display device connected to the display device (S830). In addition, some regions of one of the frames of the first interval and the frames of the second interval are displayed based on display layout information (S840).

Further, the display layout information may include first information on a position of the display device among the plurality of display devices configuring the multi display system and second information on a portion of a display device among the plurality of display devices configuring a PIP screen provided in a picture in picture (PIP) mode, and in the displaying operation (S840), displayed regions of the image provided from each of the normal mode and the PIP mode may be determined based on the first information and the second information.

Meanwhile, in the inserting operation (S820), one of even-numbered frames and odd-numbered frames of the first image may be used as the frame of the first interval, and one of even-numbered frames and odd-numbered frames of the second image may be as the frame of the second interval.

In addition, the image output information may include image identification information for identifying the first image and the second image, and in the inserting operation (S820), the image identification information may be inserted by changing a pixel value of a pixel disposed at a predetermined position of one of the frames of the first interval and the frames of the second interval.

Here, in the inserting operation (S820), the image identification information may be inserted by changing a pixel value of at least one pixel disposed at a position of one vertex of the frames of the first interval and the frames of the second interval based on at least one peripheral pixel value, and changing pixel values of the remaining pixels based on the changed pixel value.

In addition, the image output information may further include display setting information applied to the multi display system, and in the inserting operation (S820), the display setting information may be inserted by changing a pixel value of a pixel disposed at a predetermined position of the other of the frames of the first interval and the frames of the second interval, and in the displaying operation (S840), some regions of one of the frames of the first interval and the frames of the second interval may be displayed based on the display setting information.

Here, in the inserting operation (820), the display setting information may be inserted by changing values of two sub-pixels of a R sub-pixel, a G sub-pixel, and a B sub-pixel of at least one pixel disposed at the other vertex of the frames of the first interval and the frames of the second interval based on the display setting information, and changing a sub-pixel value of the other of the R sub-pixel, the G sub-pixel, and the B sub-pixel based on the changed values of the two sub-pixels.

Meanwhile, the image output information may include display setting information applied to the multi display system, and in the inserting operation (S820), the display setting information may be inserted by changing a pixel value of a pixel disposed at a predetermined position of one of the frames of the first interval and the frames of the second interval, and in the displaying operation (S840), some regions of one of the frames of the first interval and the frames of the second interval may be displayed based on the display setting information.

Meanwhile, in the transmitting operation (S830), when the first image and the second image are received, mode information instructing an operation in the PIP mode may be transmitted to the adjacent display device.

In addition, the operation (S810) of receiving the first image and the second image may include requesting an additional image to an external server when the first image is received, receiving the additional image from the external server, and setting the additional image as the second image.

Figure 9:
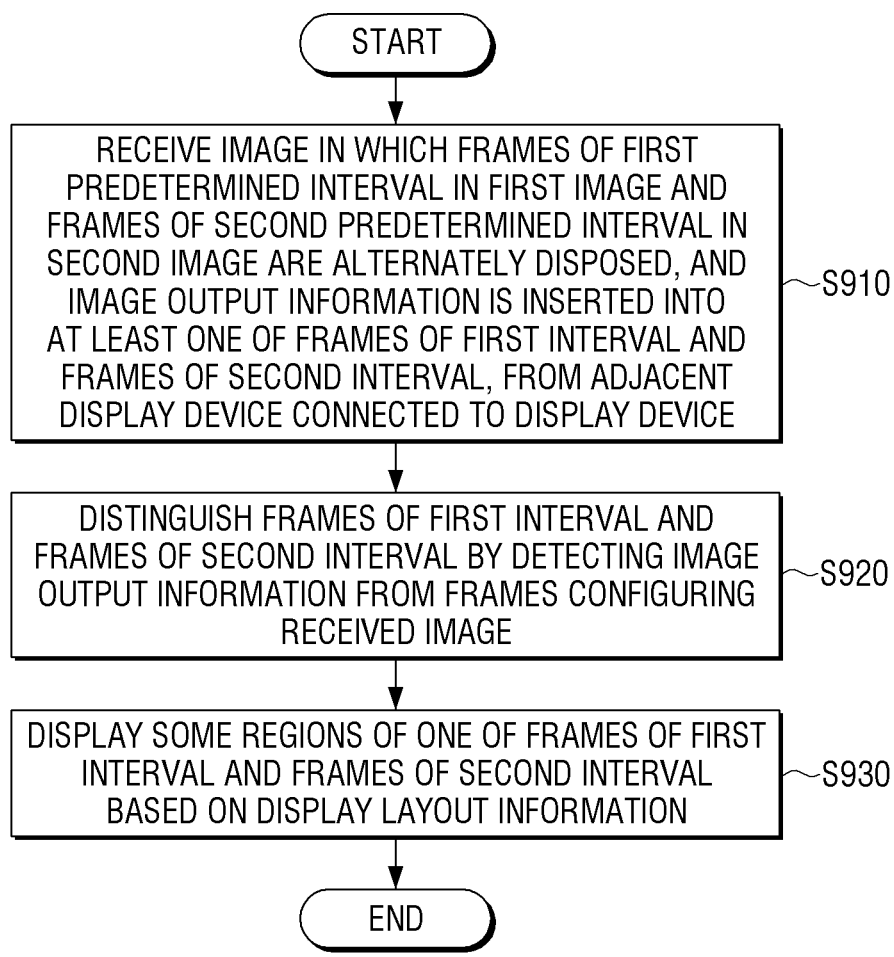
FIG. 9 is a flowchart illustrating a method of controlling a display device according to another example embodiment of the present disclosure.

FIG. 9 is a flowchart illustrating a method of controlling a display device 200 according to another example embodiment of the present disclosure.

An image in which frames of a first interval predetermined in the first image and frames of a second interval predetermined in the second image are alternately disposed and image output information is inserted into at least one of the frames of the first interval and the frames of the second interval is received from an adjacent display device connected to a display device (S910). In addition, the frames of the first interval and the frames of the second interval may be distinguished by detecting image output information from the frames configuring the received image (S920). In addition, one region of one of the frames of the first interval and the frames of the second interval is displayed based on display layout information (S930).

Here, the display layout information may include first information on a position of the display device among the plurality of display devices configuring the multi display system and second information on a portion of a display device among the plurality of display devices configuring a PIP screen provided in a picture in picture (PIP) mode, and in the displaying operation (S930), displayed regions of the image provided from each of the normal mode and the PIP mode may be determined based on the first information and the second information.

Meanwhile, the image output information may include image identification information for identifying the first image and the second image, and in the distinguishing operation (S920), the image identification information may be detected based on a pixel value of a pixel disposed at a predetermine position in the frames configuring the received image, and the frames of the first interval and the frames of the second interval may be distinguished based on the image identification information.

Here, the image output information may further include display setting information applied to the multi display system, and the method may further include detecting the display setting information based on pixel values of a R sub-pixel, a G sub-pixel, and a B sub-pixel of each of one or more pixels disposed at a predetermined position in the frames configuring the received image, and in the display operation (S930), some regions of one of the frames of the first interval and the frames of the second interval may be displayed based on the display setting information.

Meanwhile, the image output information may include display setting information applied to the multi display system, and in the distinguishing operation (S920), the display setting information may be detected based on pixel values of a R sub-pixel, a G sub-pixel, and a B sub-pixel of each of one or more pixels disposed at a predetermined position in the frames configuring the received image, and the frames of the first interval and the frames of the second interval may be distinguished depending on whether or not the display setting information is detected, and in the displaying operation (S930), some regions of one of the frames of the first interval and the frames of the second interval may be displayed based on the display setting information.

According to the various example embodiments of the present disclosure, the display device may implement the multi display system capable of sharing the display setting information and providing the PIP screen by inserting the image output image into the predetermined frame of each of the plurality of input images and alternately transmitting the frames to the adjacent display device.

Meanwhile, the methods according to the various example embodiments described above may be programmed and stored in a variety of storage mediums. Accordingly, the methods according to the various example embodiments described above may be implemented in various types of electronic devices executing the storage medium.

For example, a non-transitory computer readable medium in which a program sequentially performing the control method described above is stored may be provided.

The non-transitory readable medium may refer, for example, to a medium that semi-permanently stores data and is readable by a device. Specifically, the various application or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although various example embodiments have been illustrated and described hereinabove, the present disclosure is not limited to the above-mentioned specific example embodiments, but may be variously modified by those skilled in the art to which the present disclosure pertains without departing from the scope and spirit of the present disclosure as set forth in the accompanying claims. These modifications should also be understood to fall within the scope of the present disclosure.

What is claimed is:

1. An image providing device comprising:
an input;
an output configured to be connected to a display device; and
a processor configured to:
receive a first image and a second image through the input,
control the output to insert image output information for distinguishing frames of the first image from frames of the second image into color values of pixels included in at least one of the frames of the first image or the frames of the second image by changing part of the color values, and alternately transmit the frames of the first image and the frames of the second image to the display device so that the frames of the first image are provided between respective frames of the second image, and vice versa.

2. The image providing device as claimed in claim 1, wherein the processor is configured to use one of even-numbered frames and odd-numbered frames of the first image as the frame of the first image and to use one of even-numbered frames and odd-numbered frames of the second image as the frame of the second image.

3. The image providing device as claimed in claim 1, wherein the image output information includes image identification information for identifying the first image and the second image, and the processor is configured to insert the image identification information by changing a color value of a pixel disposed at a predetermined position of one of the frames of the first image and the frames of the second image.

4. The image providing device as claimed in claim 3, wherein the processor is configured to insert the image identification information by changing a color value of at least one pixel disposed at a position of a vertex of one of the frames of the first image and the frames of the second image based on at least one peripheral color value, and to change color values of the remaining pixels based on the changed color value.

5. The image providing device as claimed in claim 3, wherein the image output information further includes display setting information applied to a multi display system, and the processor is configured to insert the display setting information by changing a color value of a pixel disposed at a predetermined position of the other of the frames of the first image and the frames of the second image.

6. The image providing device as claimed in claim 5, wherein the processor is configured to insert the display setting information by changing sub-pixels values of two sub-pixels of an R sub-pixel, a G sub-pixel, and a B sub-pixel of at least one pixel disposed at a position of a vertex of the other of the frames of the first image and the frames of the second image based on the display setting information, and to change a sub-pixel value of a remaining one of the R sub-pixel, the G sub-pixel, and the B sub-pixel based on the changed sub-pixel values of the two sub-pixels.

7. The image providing device as claimed in claim 1, wherein the image output information includes display setting information applied to a multi display system, and the processor is configured to insert the display setting information by changing a color value of a pixel disposed at a predetermined position of one of the frames of the first image and the frames of the second image.

8. The image providing device as claimed in claim 1, wherein the processor is configured to transmit mode information instructing an operation in a picture in picture (PIP) mode to the display device when the first image and the second image are received through the input.

9. The image providing device as claimed in claim 1, further comprising a communicator comprising communication circuitry configured to perform communication with an external server, wherein the processor is configured to request an additional image corresponding to the first image from the external server when the first image is received through the input, and to set the additional image as the second image when the additional image is received from the external server.

10. A display device configuring a multi display system, the display device comprising:

an input;

a display; and a processor, wherein an image received through the input comprises an image in which frames of a first image and frames of a second image are alternately disposed, so that the frames of the first image are provided between respective frames of the second image, and vice versa, and image output information for identifying the first image and the second image is inserted into color values of pixels included in at least one of the frames of the first image or the frames of the second image by changing part of the color values, and the processor is configured to distinguish the frames of the first image and the frames of the second image by detecting the image output information from the frames of the received image, and to control the display to display some regions of one of the frames of the first image and the frames of the second image based on display layout information.

11. The display device as claimed in claim 10, further comprising a storage in which the display layout information is stored, the display layout information includes first information on a position of the display device among a plurality of display devices configuring the multi display system, and second information on a position of the display device of a plurality of display devices configuring a picture in picture (PIP) screen provided in a PIP mode, and the processor is configured to determine a displayed region of the image provided in each of a normal mode and the PIP mode based on the first information and the second information stored in the storage.

12. The display device as claimed in claim 10, wherein the image output information includes image identification information for identifying the first image and the second image, and the processor is configured to detect the image identification information based on a color value of a pixel disposed at a predetermined position in the frames configuring the received image, and to distinguish the frames of the first image and the frames of the second image based on the image identification information.

13. The display device as claimed in claim 12, wherein the image output information further includes display setting information applied to the multi display system, and the processor is configured to detect the display setting information based on color values of an R sub-pixel, a G sub-pixel, and a B sub-pixel of at least one pixel disposed at a predetermined position in the frames of the received image, and to display some regions of one of the frames of the first image and the frames of the second image based on the display setting information.

14. The display device as claimed in claim 10, wherein the image output information includes display setting information applied to the multi display system, and the processor is configured to detect the display setting information based on color values of an R sub-pixel, a G sub-pixel, and a B sub-pixel of at least one pixel disposed at a predetermined position in the frames of the received image, to distinguish the frames of the first image and the frames of the second image depending on whether the display setting information is detected, and to display some regions of one of the frames of the first image and the frames of the second image based on the display setting information.

15. A method of controlling an image providing comprising:
   receiving a first image and a second image;
   inserting image output information for distinguishing frames of the first image from the frames of the second image into color values of pixels included in at least one of the frames of the first image or the frames of the second image by changing part of the color values; and
   alternately transmitting the frames of the first image and the frames of the second image to a display device connected to the image providing device so that the frames of the first image are provided between respective frames of the second image, and vice versa, and so that a multi display system including the display device can display at least parts of the first and second images at the same time in a picture-in-picture (PIP) manner.

16. The method as claimed in claim 15, wherein in the inserting of the image output information, one of even-numbered frames and odd-numbered frames of the first image is used as the frame of the first image and one of even-numbered frames and odd-numbered frames of the second image is used as the frame of the second image.

17. The method as claimed in claim 15, wherein the image output information includes image identification information for identifying the first image and the second image, and
   wherein in the inserting of the image output information, the image identification information is inserted by changing a color value of a pixel disposed at a predetermined position of one of the frames of the first image and the frames of the second image.

18. The image providing device as claimed in claim 1, wherein the output information for identifying the first image and the second image is inserted into color values of pixels by changing only part of the color values of pixels at predetermined positions of the at least one of frames of the first image or frames of the second image.

19. The image providing device as claimed in claim 18, wherein the color values of one or more pixels are changed at a plurality of different predetermined positions of the at least one of the frames of the first image or the frames of the second image, the different predetermined positions being displaced from each other by a plurality of pixels.

* * * * *